United States Patent [19]

Rice et al.

[11] Patent Number: 4,789,126

[45] Date of Patent: Dec. 6, 1988

[54] PEDESTAL SEAT MOUNTING ASSEMBLY

[75] Inventors: Dennis A. Rice; Jerry A. Thurow, both of Dubuque, Iowa

[73] Assignee: Flexsteel Industries, Inc., Dubuque, Iowa

[21] Appl. No.: 88,862

[22] Filed: Aug. 24, 1987

[51] Int. Cl.[4] ............................................. A47B 97/00
[52] U.S. Cl. .................................... 248/503.1; 297/15
[58] Field of Search ............... 248/503.1, 503, 500, 248/506, 507, 510; 297/15; 296/65 R

[56] References Cited

U.S. PATENT DOCUMENTS

| 647,286 | 4/1900 | Zack | 248/503.1 |
| 4,114,947 | 9/1978 | Nelson | 248/503.1 X |
| 4,194,782 | 3/1980 | Itoh | 296/65 R |
| 4,645,166 | 2/1987 | Checkley et al. | 248/503.1 |
| 4,667,917 | 5/1987 | Takace | 248/503.1 X |

FOREIGN PATENT DOCUMENTS 0583223 12/1946 United Kingdom ............... 248/510

Primary Examiner—Ramon O. Ramirez
Attorney, Agent, or Firm—Emrich & Dithmar

[57] ABSTRACT

A pedestal seat mounting assembly includes an upper pedestal portion constructed and arranged for removable attachment to a base plate secured to the floor of vehicle and a locking assembly which is rotatable to engage the base plate is provided.

7 Claims, 3 Drawing Sheets

U.S. Patent   Dec. 6, 1988   Sheet 1 of 3   4,789,126
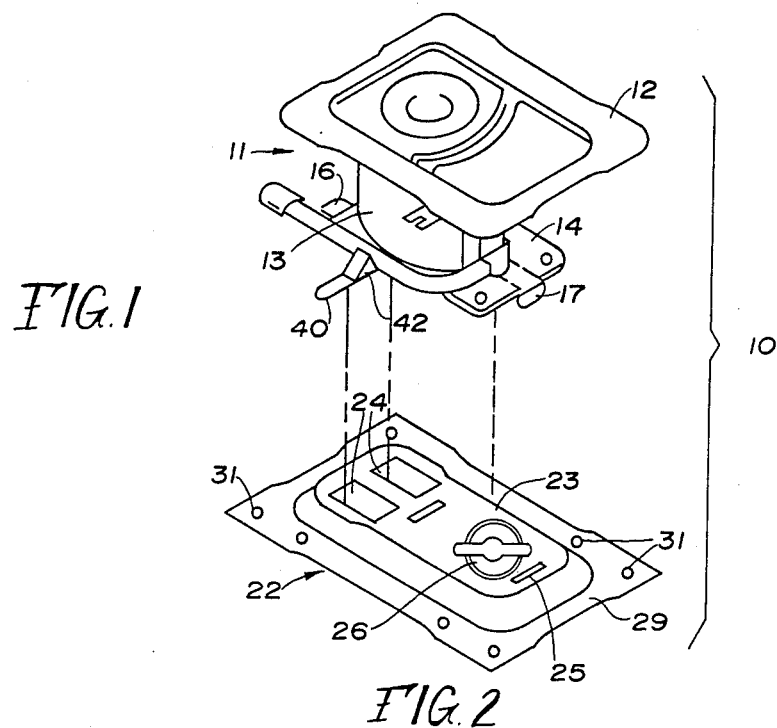
FIG. 1
FIG. 2
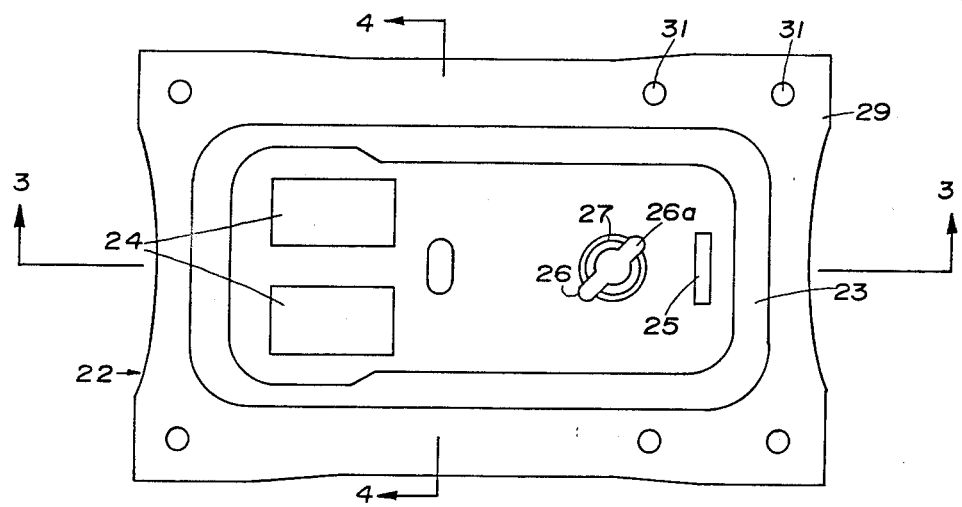
FIG. 3
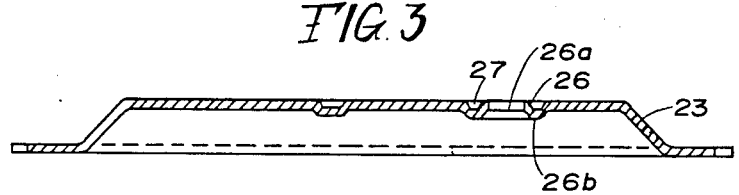
FIG. 4
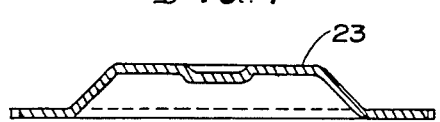

PEDESTAL SEAT MOUNTING ASSEMBLY

BACKGROUND OF THE INVENTION

The present invention relates to a novel assembly for releasably securing a seat pedestal to the floor of a vehicle.

Prior art structures have been suggested for securing the pedestal of a seat assembly onto a base plate which is attached to the floor of the vehicle. Such structures include the use of individual hooks extending below the pedestal assembly that upon rotation of the sliding of the pedestal assembly the hooks lock into a base plate to position the seat pedestal assembly onto the base plate. The problem with these prior art structures is that it is difficult to align the pedestal with the base plate, and after installation, vehicle vibrations often result in the pedestal becoming loose and/or rattling during the usage of the installed seat pedestal assembly. Additionally, such prior art structures are difficult to install and require aligning a plurality of hooks which is time consuming and which does not provide a positive and quick release mechanism for mounting and demounting the seat pedestal assembly to the base plate on the floor of the vehicle.

SUMMARY OF THE INVENTION

It is one object of the present invention to provide a novel mechanism for releasably securing a vehicle seat pedestal to the floor of the vehicle.

Another object of the present invention is a quick release mechanism for fixedly securing a vehicle seat pedestal to the floor of a vehicle.

Still another object of the present invention is a novel and inexpensive assembly for rapidly and fixedly securing a seat pedestal assembly to the floor of a vehicle.

The mounting mechanism for releasably securing a seat pedestal assembly to the floor of a vehicle includes a floor or base plate, fixedly attached to the floor of the vehicle with the floor plate including pocket or openings and a locking ramp therein. The pedestal seat mounting assembly includes a housing having an upper seat supporting member portion and a lower seat attachment plate or member portion. The lower seat attachment plate includes anchor, hook or finger members thereon and a locking member that extends downwardly from the lower seat attachment plate which engages, respectively the openings and the locking ramp on the floor or base plate, as will hereinafter be described.

To mount the pedestal seat mounting assembly to the floor or base plate, anchor, hook or finger members on the lower seat attachment plate are positioned within the openings in the base plate and the locking member is operatively engaged with the locking ramp. The locking member is attached to a locking arm which is rotatable, such that when the locking member freely engages the locking ramp, the locking arm is in the open position. When the locking arm is moved to the closed position, the locking member is rotated to engage the locking ramp to fixedly mount the pedestal seat assembly to the base plate and floor of the vehicle.

A safety lock is provided which engages the locking arm to firmly retain the locking arm and the locking member in the locked position. When it is desired to remove the pedestal seat from the base plate and floor of the vehicle, the safety lock is released and the locking arm is pivotally rotated from the locked position to the open position, wherein the locking member is disengaged from the locking ramp of the base plate to permit the pedestal seat to be removed from the base plate mounted to the floor of the vehicle.

The invention consists of certain novel features and structural details hereinafter fully described, illustrated in the accompanying drawings, particularly pointed out in the appended claims. It being understood that various changes in the details may be made without parting from the spirit and scope thereof, or sacrificing any of the advantages of the present invention.

BRIEF DESCRIPTION OF THE DRAWINGS

FIG. 1 is a perspective view showing the positioning of the pedestal seat assembly onto the base I in accordance with the present invention;

FIG. 2 is a top view of the base plate in accordance with the present invention;

FIG. 3 is a cross-sectional view of the base plate taken along lines 3—3 in FIG. 2;

FIG. 4 is a cross-sectional view taken along the lines 4—4 of the base plate shown in FIG. 2;

DETAILED DESCRIPTION OF THE DRAWINGS

Figure 5:
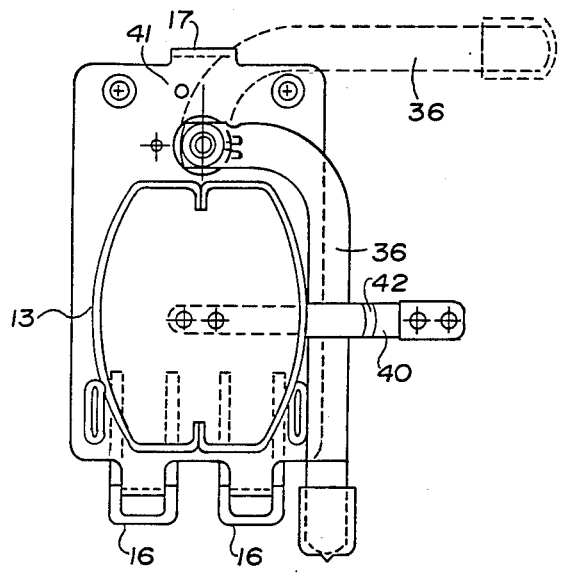
FIG. 5 is a top plan view showing the placement of the pedestal mounting assembly onto the base plate and the movement of the locking arm member from a locked position to the open or unlocked position in accordance with the present invention.

For the purpose of facilitating and understanding the present invention illustrated in the drawings of the several embodiments, like numerals have been used throughout the several views to designate the same or similar parts. In FIGS. 1, 2, 5 and 9 illustrate the pedestal seat mounting assembly 10 in accordance with the present invention. Specifically, the pedestal seat mounting assembly 10 includes a base plate member or means 22 which is mounted to the floor of a vehicle (not shown). The base plate member 22 includes a raised crown or center section or portion 23 (FIG. 3) which cooperates with a lower seat attachment plate or member 14 to mount the upper seat pedestal member 11 to the floor of a vehicle. The base plate member 22 includes a rim portion 29 having mounting apparatus 31 which receive mounting bolts (not shown) for mounting the base plate 22 to the floor of a vehicle, as is well known in the art. As shown in FIG. 2, the base plate member 22 includes a pair of pockets or openings 24 therein, which cooperate with the lower seat attachment plate or member 14, as will herein be described. The raised crown or center section 23 further includes a locking ramp and opening 26 which cooperates with a locking pin member 20 (FIG. 7) which extends downwardly from the lower seat attachment plate 14. The raised crown or center section 23 of the floorplate member 22 may include an opening 25 therein which cooperates with a forward projection 17 (FIG. 8) which extends downwardly from the lower seat attachment plate 14, as will hereinafter be described.

Figure 8:
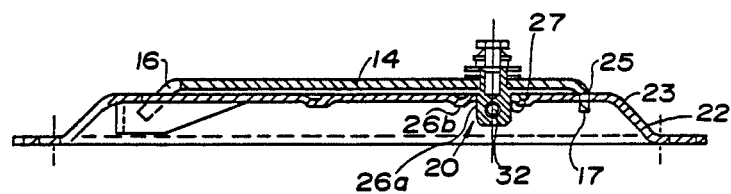
FIG. 8 is an enlarged cross-sectional view showing the engagement of the lower seat attachment plate of the upper seat pedestal member to the base plate in accordance with the present invention.

As shown in FIGS. 3 and 8, the locking ramp and opening 26 is adapted to receive a locking member 20 which projects downwardly through the ramp opening 26. Upon rotation of the locking member, the locking pin portion 32 engages the ramp portion 27 to firmly retain the upper seat pedestal member 11 to the base plate 22, as shown in FIG. 8.

Figure 6:
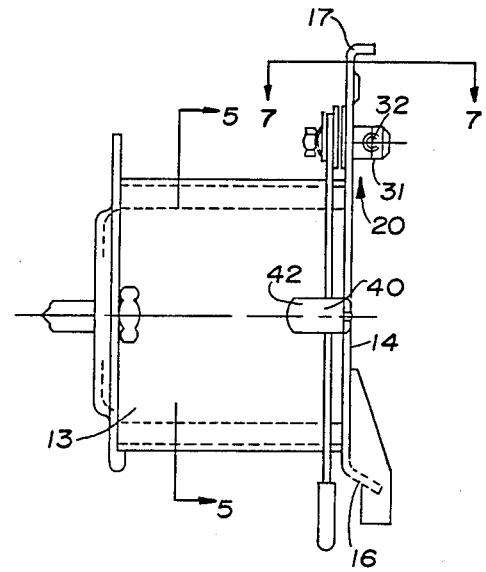
FIG. 6 is a side elevation view showing the engagement of the upper seat pedestal member in accordance with the present invention.

In FIGS. 1, 5 and 6, the upper seat pedestal member 11 is comprised of an upper seat supporting member portion or plate 12, a central pedestal portion 13, and a lower seat attachment plate or member 14. The lower seat attachment plate or member 14 includes a pair of hooks or finger members 16 extending rearwardly and downwardly therefrom as well as a forward projection 17 which cooperates with the opening or groove 25 in the lower plate member 22. However, it is within the scope of the present invention that the lower plate 14 may not include a forward projection 17.

Figure 7:
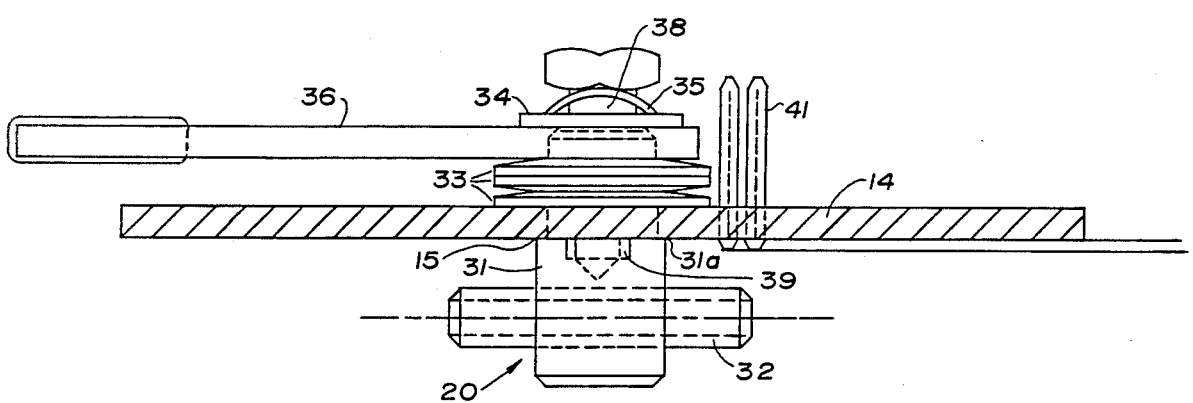
FIG. 7 is an enlarged cross-sectional view of the locking assembly in accordance with the present invention.

As shown in FIGS. 6-8, the lower seat attachment plate 14 includes a locking member assembly 20 extending downwardly from the plate 14. The locking member assembly is comprised of a shaft 31 having a shoulder 31a which is adapted to be received in opening 15 in lower seat plate 14. A locking pin portion 32 is mounted and extends through the shaft 31 at its lowermost portion. The shaft 31 includes compression members 33, a flat washer 34, and spring washer 35 and the uppermost portion of the locking member assembly is a threaded bolt 38 which engages a threaded bore 39 within the shaft 31. The assembly further includes a locking arm 36 retained on the shaft by the bolt 38 and which is indexed to the shaft 31 and permits rotation of the locking pin assembly 20 from an unlocked position, as shown in the dotted lines in FIG. 5, to a locking position, wherein the locking arm 36 is in the closed at rest position. The lower seat attachment plate 14 further includes a stop pin 41 (FIG. 7) mounted thereon. The stop pin 41 is engaged by the locking arm 36 when the locking arm is in the forward open position, as shown in the dotted lines in FIGS. 5 and 9.

Figure 9:
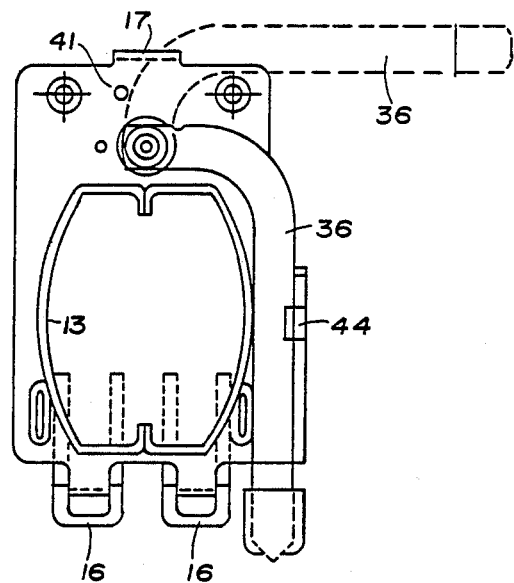
FIG. 9 is a top perspective view showing another embodiment of the safety lock member engaging the locking arm when the locking arm is in the closed position in accordance with the present invention.

In the embodiment of the present invention as shown in FIG. 5, a safety locking arm 40 is provided which engages the locking arm 36 to retain the same in the locked position when the upper seat pedestal assembly 11 is mounted to the base plate member 22. As shown in FIGS. 5 and 6, the safety lock arm 40 is mounted to the undersurface of the lower seat attachment plate 14 and extends outwardly therefrom and includes a projection 42 thereon, which is shown in FIG. 1, which engages the locking arm 36 to retain the locking arm in the closed position, wherein the upper seat pedestal assembly 11 is firmly mounted and fixedly attached to the base plate 22. An alternative embodiment of the safety lock arm 40 is shown in FIG. 9. There a flexible hook projection 44 extends upwardly from the lower plate member 14 which engages the locking arm 36 to hold the locking arm in the closed position.

When it is desired to mount the upper seat pedestal member 11 to the base plate 22, the lower seat attachment plate 14 having the upper seat supporting member 12 and central pedestal housing 13 thereon, is positioned over the base plate member 22. The pair of anchor members 16 are positioned within the pockets or openings 24 in the base plate member 42 and, if desired, the forward projection 17 is adapted to be received within the opening or groove 25 in the base plate member 22. When the locking arm 36 is rotated to the open position where it engages the stop projections 41, as shown in the dotted lines in FIGS. 5 and 9, the locking member 20 is oriented to be received by the opening within the locking ramp 26, with the locking pin 32 positioned beneath the ramp portion 26b. Upon the rotation of the locking arm 36 from the dotted lines to the solid lines, as shown in the arrows in FIGS. 5 and 9, the locking pin portion 32 is rotated to engage the ramp portion 26b of the locking ramp 26 to firmly lock the lower seat pedestal seat member 11 to the base plate member 22. The rotation of the locking member 20 to the fully engaged and locked position, the compression members 33 are compressed to provide a constant pressure between the locking pin portion and the ramp portion 26b. When the locking arm 36 is in the fully locked position, the safety lock arm 40 and projection 42 thereon engage the same to prevent the locking arm 36 from being detached and moved to the open unlocked position.

When it is desired to remove the upper seat pedestal member 11 from the floor of a vehicle to permit the carrying larger loads and the like, the safety lock arm 40 is depressed downwardly thereby releasing the locking arm 36. The locking arm 36 is rotated from the locked position to the open position as shown in the dotted lines of FIGS. 5 and 9. In such a position, the locking pin portion 32 of the locking member 20 is aligned with the opening 26a of the ramp 26 and permits ready removal of the upper seat pedestal seat member 11 from the base plate member 22.

The advantages of the present invention are that the pedestal seat mounting assembly may be quickly and fixedly mounted to the base plate member without the necessity of aligning a plurality of hook portions which may become loose due to vibration and usage of the vehicle. Additionally, the unique and novel locking member, which is spring-mounted to the lower seat attachment plate 14, permits a firm and positive retention of the upper seat pedestal member to the base plate, which is free of vibration and which permits and insures a complete attachment of the upper seat pedestal member to the floor of the vehicle.

We claim:

1. A pedestal seat mounting assembly, including in combination:

a base plate attached to the floor of a vehicle, said base plate including pocket means therein and a locking ramp and opening therein;

an upper seat pedestal member having anchoring means and a locking means, said anchoring means including a pair of projections extending from one end of said upper seat pedestal, said locking means extending downwardly from said upper seat pedestal member with said upper seat pedestal member being engageable with said base plate such that said projections of said anchoring means engage said pocket means and said locking means is received by said locking ramp and opening, and said locking means being adapted to rotate from a first position, wherein said locking means is received by said locking ramp and opening, to a second position, wherein said locking means is engaged with said locking ramp to fixedly mount said upper seat pedestal member to the floor of the vehicle.

2. The pedestal seat mounting assembly, according to claim 1 wherein said locking means includes a locking pin member and locking arm means operatively connected with said locking pin member, with said locking arm means being movable from a first position to a second position to predeterminately rotate said locking pin member, said locking pin member engaging said locking ramp.

3. The pedestal seat mounting assembly according to claim 1 wherein said anchoring means further includes a tongue projection extending from the end of said upper seat pedestal member opposite of said one end of said upper seat pedestal member and said base plate further includes a groove opening therein adapted to receive said tongue projection when said upper said pedestal member is in engagement with said base plate.

4. A pedestal seat mounting assembly, including in combination:
a base plate attached to the floor of a vehicle, said base plate including pocket means therein and a locking ramp and opening therein,
an upper seat pedestal member having anchoring means and a locking means extending downwardly from said upper seat pedestal member with said upper seat pedestal member being engageable with said base plate such that said anchoring means is engageable with said pocket means and said locking means is received by said locking ramp and opening,
said locking means including a handle, a shaft, means connecting said handle to said shaft at one end of said shaft, and a locking pin mounted on the other end of said shaft,
said handle being adapted to rotate said locking means from a first position, wherein said locking pin is received by said locking ramp and opening with said locking pin extending through said opening, to a second position, wherein said locking pin is in engagement with said locking ramp to fixedly mount said upper seat pedestal member to the floor of the vehicle.

5. The pedestal seat mounting assembly according to claim 4 wherein said pedestal seat assembly further includes a safety latch arm having a hook portion engageable with said handle of said locking means when said locking means is in said second position to prevent rotation of said handle, said latch arm being constructed and arranged to be movable manually out of engagement with said arm to permit rotation of said arm to said first position.

6. The pedestal seat mounting assembly according to claim 4 wherein said upper seat pedestal member further includes stop means positioned thereon which engaged by said handle when said handle is rotated to said first position.

7. A pedestal seat mounting assembly, including in combination:
a base plate attached to the floor of a vehicle, said base plate including pocket means therein and a locking ramp and opening therein,
an upper seat pedestal member having anchoring means and a locking means extending downwardly from said upper seat pedestal member with said upper seat pedestal member being engageable with said base plate such that said anchoring means is engageable with said pocket means and said locking means is received by said locking ramp and opening,
said locking means including a handle for rotating said locking means from a first position, wherein said locking means is received by said locking ramp and opening, to a second position, wherein said locking means is engaged with said locking ramp to fixedly mount said upper seat pedestal member to the floor of the vehicle, said upper seat pedestal member including stop means including a projection extending upwardly from said upper seat pedestal member and which is engaged by said handle when said handle is rotated to said first position.

* * * * *